(12) United States Patent
Mauro et al.

(10) Patent No.: US 9,037,472 B2
(45) Date of Patent: May 19, 2015

(54) METHOD AND SYSTEM FOR FACILITATING COMMUNICATIONS FOR A USER TRANSACTION

(75) Inventors: David Andrew Mauro, Montreal (CA); Simona Gandrabur, Verdun (CA)

(73) Assignee: Nuance Communications, Inc., Burlington, MA (US)

( * ) Notice: Subject to any disclaimer, the term of this patent is extended or adjusted under 35 U.S.C. 154(b) by 248 days.

(21) Appl. No.: 13/452,347

(22) Filed: Apr. 20, 2012

(65) Prior Publication Data

US 2013/0282380 A1    Oct. 24, 2013

(51) Int. Cl.
| | |
|---|---|
| *G10L 21/00* | (2013.01) |
| *G06Q 20/32* | (2012.01) |
| *G10L 15/28* | (2013.01) |
| *H04M 3/493* | (2006.01) |
| *G06Q 20/30* | (2012.01) |
| *G10L 15/22* | (2006.01) |

(52) U.S. Cl.
CPC ............. *G06Q 20/32* (2013.01); *G10L 15/285* (2013.01); *H04M 3/4936* (2013.01); *H04M 2203/252* (2013.01); *G06Q 20/305* (2013.01); *G10L 2015/221* (2013.01)

(58) Field of Classification Search
CPC .............. G10L 15/285; H04M 3/4396; H04M 2201/40
USPC ...................... 704/270–275; 379/88.01, 88.04
See application file for complete search history.

(56) References Cited

U.S. PATENT DOCUMENTS

| | | | | |
|---|---|---|---|---|
| 7,263,483 | B2 * | 8/2007 | Pearah et al. ................. | 704/235 |
| 7,668,718 | B2 * | 2/2010 | Kahn et al. .................... | 704/270 |
| 7,813,485 | B2 * | 10/2010 | Yin et al. ..................... | 379/88.13 |
| 7,835,911 | B2 * | 11/2010 | Balchandran et al. ........ | 704/257 |
| 8,260,619 | B1 * | 9/2012 | Bansal et al. ................. | 704/275 |
| 8,335,690 | B1 * | 12/2012 | Bansal et al. ................. | 704/257 |
| 8,340,971 | B1 * | 12/2012 | Abella et al. ............... | 704/270.1 |
| 8,666,741 | B2 * | 3/2014 | Reynolds et al. ............. | 704/235 |
| 2004/0215452 | A1 * | 10/2004 | Pearah et al. ................. | 704/231 |
| 2006/0285662 | A1 * | 12/2006 | Yin et al. ..................... | 379/88.16 |
| 2007/0106515 | A1 * | 5/2007 | Wong .............................. | 704/270 |
| 2007/0143114 | A1 * | 6/2007 | Chan et al. ..................... | 704/270 |
| 2008/0140413 | A1 * | 6/2008 | Millman et al. ............... | 704/270 |
| 2008/0226042 | A1 * | 9/2008 | Singh .......................... | 379/88.04 |
| 2009/0209239 | A1 * | 8/2009 | Montesdeoca ............. | 455/414.2 |
| 2009/0287514 | A1 * | 11/2009 | West ................................ | 705/7 |
| 2010/0166158 | A1 * | 7/2010 | Costello et al. ............ | 379/88.04 |

(Continued)

*Primary Examiner* — Douglas Godbold

(74) *Attorney, Agent, or Firm* — Hamilton, Brook, Smith & Reynolds, P.C.

(57) ABSTRACT

Current human-to-machine interfaces enable users to interact with a company's database and enter into a series of transactions (e.g., purchasing products/services and paying bills). Each transaction may require several operations or stages requiring user input or interaction. Some systems enable a user to enter a voice input parameter providing multiple operations of instruction (e.g., single natural language command). However, users of such a system do not know what types of commands the system is capable of accepting. Embodiments of the present invention facilitate communications for user transactions by determining a user's goal transaction and presenting a visual representation of a voice input parameter for the goal transaction. The use of visual representations notifies the user of the system's capability of accepting single natural language commands and the types of commands the system is capable of accepting, thereby enabling a user to complete a transaction in a shorter period of time.

24 Claims, 7 Drawing Sheets

(56) References Cited

U.S. PATENT DOCUMENTS

2011/0228915 A1* 9/2011 Chen et al. ........... 379/88.04
2012/0053947 A1* 3/2012 Liu ........................ 704/275
2013/0077767 A1* 3/2013 Suendermann et al. ... 379/88.01

* cited by examiner

METHOD AND SYSTEM FOR FACILITATING COMMUNICATIONS FOR A USER TRANSACTION

BACKGROUND OF THE INVENTION

Many human-to-machine interfaces (e.g., interactive voice response (IVR) systems and web browsers) enable users to enter in transactional relationship with customer service providers. For example, users of the human-to-machine interfaces may be able to purchase products/services or pay bills. In some scenarios a transaction requires multiple operations of interaction to be completed.

SUMMARY OF THE INVENTION

An embodiment of the present invention determines a goal transaction for a user to provide input a to human-to-machine interface. A goal transaction may be an intent transaction of the user with the human-to-machine interface during a communications session. Alternatively, the goal transaction may be an interaction between the user and the interface that the interface is expecting to occur.

The embodiment may determine the goal transaction by determining all possible navigation paths of a state machine associated with the interface that a user may traverse. In addition, the goal transaction may be determined based on historical statistics based on a history of the user's transactions or other user's transactions with the interface. Also, the goal transaction may be determined based on pending action items requiring user input (e.g., payment of a bill).

The embodiment constructs and presents a visual representation of a voice input parameter for the goal transaction, where the visual representation of the voice input parameter represents multiple operations of the goal transaction optionally available for the user to employ to achieve interaction with the human-to-machine interface in fewer stages than through individual interactions with the human-to-machine interface. The embodiment further enables the user interaction with the human-to-machine interfaces via the visual representation.

In addition, the embodiment may track user transactions with the human-to-machine interface and store the user transactions with the human-to-machine interface. Further, the embodiment may determine the goal transaction for the user based on the stored user transactions.

The embodiment may determine the goal transaction based on a plurality of transactions with the human-to-machine interface of a plurality of users. Also, the embodiment may determine the goal transaction of the user by anticipating the goal transaction based on a current user input to the human-to-machine interface. In addition, the embodiment may determine the goal transaction of the user by determining pending action items requiring user input. For example, the pending action items may include at least one of the following: payment of a bill, address change, and service modification.

Further, the presented visual representation enables the user to input the input parameter by selecting the visual representation via a touch screen. The visual representation may include fill-in-the-blank field entries to accept additional user input. Also, the visual representations may be presented to the user via a communications interface enabling multi-mode communications with the human-to-machine interface.

The embodiment may further notify the user that the human-to-machine interface supports input parameters including multiple operations of the goal transaction. Further, the embodiment may analyze the human-to-machine interface to determine states defining available interactions for the user to interact with the human-to-machine interface and determine the goal transaction by accounting for at least a subset of the states.

It should be understood that embodiments of the present invention can be implemented in the form of a method, system, or computer readable medium with program codes embodied thereon, for facilitating communications for a user transaction.

For ease of reading, the term "system" is used in various portions of the description and may represent some or all forms of embodiments and implementations of the present invention, such as systems, methods, apparatuses, devices, computer readable media, network nodes, and networks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Current human-to-machine interfaces enable users to interact with a company's database and enter into a series of transactions (e.g., purchasing products/services and paying bills). Each transaction may require several operations or stages to accept user input or interaction. Some systems enable a user to enter a voice input parameter providing multiple operations of instructions (e.g., single natural language command). However, users of such a system typically do not know what types of commands the system is capable of accepting, at least in the initial period of using a new system. In addition, users may not know that the system is capable of accepting such a single natural language command.

Embodiments of the present invention improve a user's experience with a new or existing system by assisting the user in learning the capabilities of the human-to-machine interface in a much faster manner than is currently done without the embodiments. Embodiments do so by determining a goal transaction for a user to provide input to human-to-machine interface, then constructing and presenting a visual representation of a voice input parameter for the goal transaction. The visual representations of the voice input parameter can represent multiple operations of the goal transaction optionally available for the user to employ to achieve interaction with the human-to-machine interface in fewer stages than through individual interactions with the human-to-machine interface. In addition, the embodiments enable user interaction with the human-to-machine interfaces via the visual representation.

It should be noted that voice input may also include speech input. Both voice input and speech input may arise out of an utterance (e.g., spoken input from a user). An utterance may be a single word, entire phrase, sentence, or even several sentences. It should be further noted that voice input and speech input may be used interchangeably herein, and in either case, the broadest meanings are intended.

Figure 1:
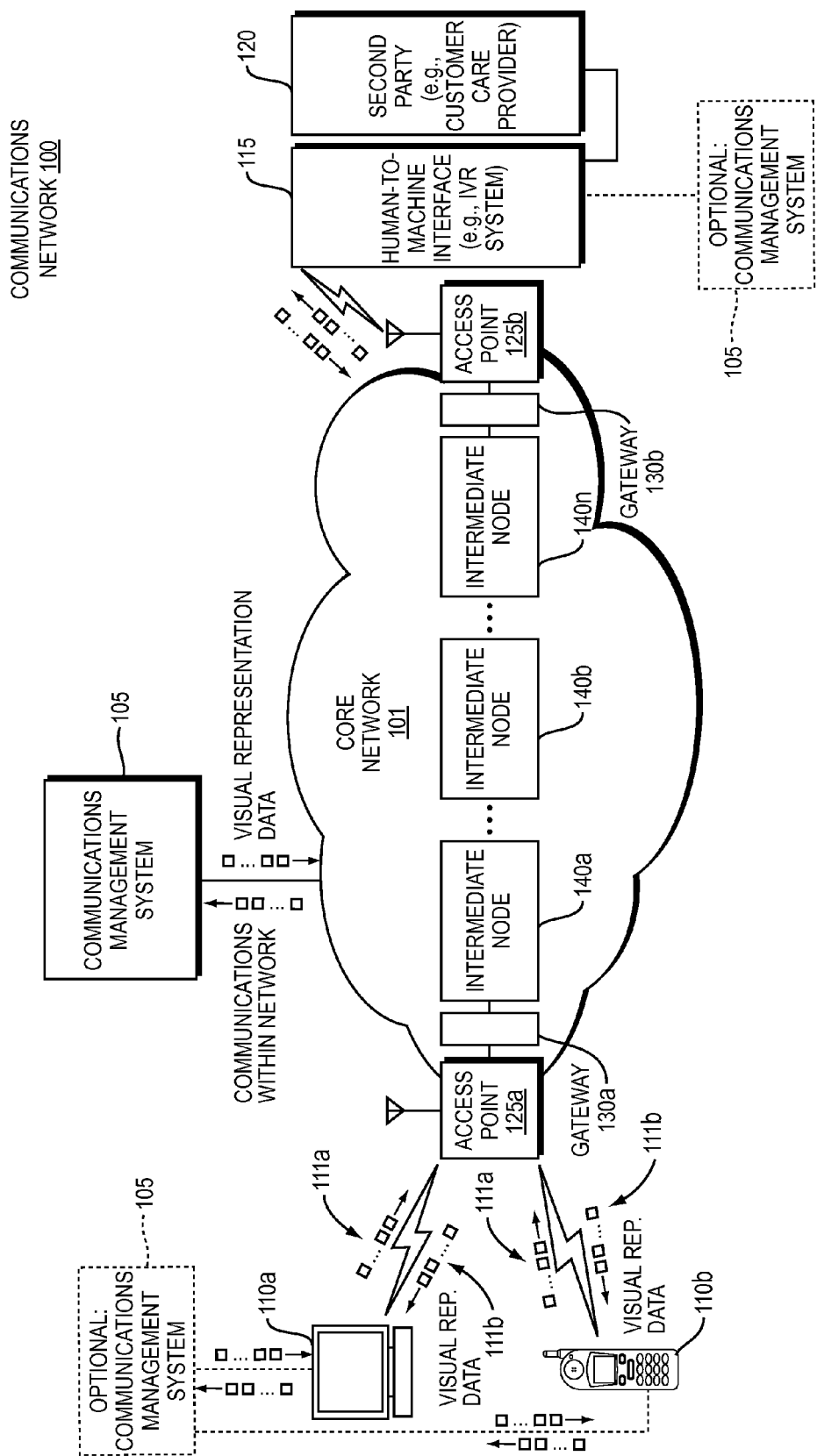
FIG. 1 is a network diagram illustrating a communications management system for facilitating communications for a user transaction in accordance with an example embodiment of the present invention.

FIG. 1 is a high-level block diagram of a communications network 100 that may be used within a context of an implementation of the present invention. The communications network 100 includes a collection of communications links interconnecting a plurality of nodes, such as communications units 110a-b, access points 125a-b, intermediate nodes 140a-n, communications management system 105, and a second party 120 via a human-to-machine interface 115 (e.g., an all-interactive voice response (IVR) system), to form an internetwork of nodes. These internetworked nodes communicate by exchanging data packets according to a pre-defined set of network protocols, such as the Transmission Control Protocol/Internet Protocol (TCP/IP) and the Session Initiation Protocol (SIP). A network protocol as used herein is a formal set of rules that define how data is exchanged between nodes in a communications network.

As will be described in more detail below, the communications management system 105 may be employed to improve, customize, or otherwise modify a user's experience with the human-to-machine interface 115. Before describing the communications management system 105 in more detail, a description of the communications network 100 is provided. It should be understood that the communications management system 105 may be employed in other network topologies or other applications, such as single processor machines.

The intermediate nodes 140a-n, are typically conventional intermediate nodes, such as routers configured to operate within a communications network 101 (e.g., a Voice Over Internet Protocol (VoIP) network). The access points 125a-b, contain logic that enable the communications units 110a-b, to transfer information (e.g., data) via the access points 125a,, 125b, to the human-to-machine interface 115 via the intermediate modes 140a-c. To that end, the access points 125a-b, include circuitry configured to transmit and receive signals (e.g., radio frequency (RF) signals) that carry the information via wireless links 111a,, 111b. Examples of access points 125a-b, that may be used with the present invention include certain Institute of Electrical and Electronics Engineers (IEEE) 802.11, compliant access points, as well as certain cellular telephone wireless systems that support the transfer of traffic (e.g., data traffic). Other forms of access points now known or hereafter developed are contemplated to be operable with embodiments of the present invention.

The communications units 110a-b, may be conventional communication units, such as laptop computers, desktop computers, wireless transmit/receive units (WTRUs) (e.g., wireless telephones and personal digital assistants (PDAs)), Internet Protocol IP) telephones, and the like, that enable audible and/or visual communications to be converted into signals that are transferred to the access points 125a-b, via the wireless links 111a,, 111b. The access points 125a-b, interface the communications units 110a-b and human-to-machine interface 115 with the network 100 and enable signals to be transferred among the communications units 110a-b, human-to-machine interface 115, and the network 100. Specifically, the access points 125a-b, convert signals, received from the communications units 110a-b, and human-to-machine interface 115 via the wireless links, 111a,, 111b, into data packets (not shown) that are transferred onto the network 100, as well as convert packets received from the network into signals that are transferred to the communications units 110a-b, and human-to-machine interface 115. Information (e.g., data, voice, or video) is typically conveyed between the communications units 110a-b, and human-to-machine interface 115. It should be noted that embodiments of the present invention may be adapted to work with fixed as well as mobile devices that are able to communicate via a communications network. These fixed devices may include telephone units, personal computers, and the like that are wired to a network.

The human-to-machine interface 115 may employ a telephony interface (not shown) which allows users of the communications units 110a-b, to interact with a database (not shown) (e.g., a customer service provider database) to acquire information from or enter data into the database via a telephone keypad or by speech recognition. For example, banks and credit card companies use IVR systems so that their customers can receive up-to-date account information instantly and easily without having to speak directly to a person.

As illustrated, a communications management system 105 may be located at an intermediate point of the communications network 100 between communication units 110a-b, and human-to-machine interface 115. Optionally, the communications management system 105 may be logically or physically coupled to the communications units 110a-b, or human-to-machine interface 115. The communications management system 105 may acquire knowledge of the existence of the human-to-machine interface 115 by active searching or passive learning. For example, the communications management system 105 may search for human-to-machine interfaces actively by issuing discovery messages through the communications network 101 that elicit a specific response unique to a specific type of human-to-machine interface (e.g., IVR system). Alternatively, the communications management system 105 may passively learn about human-to-machine interfaces by monitoring communications messages over the communications network 101 to determine whether a communications session is being established with the human-to-machine interface 115, thereby enabling the communications management system 105 to discover the human-to-machine interface 115. In another embodiment, the human-to-machine interface 115 may be discovered by the communications management system 105 via a notification message from communications units 110a-b, human-to-machine interface 115, or a $3^{rd}$, party (not shown).

The communications management system 105 may then inspect the discovered human-to-machine interface 115 to determine states defined therein. Each state of the human-to-machine interface 115 may represent choices available to a user to navigate the human-to-machine interface. For each state of the human-to-machine interface 115, the communications management system 105 may compose visual representations (not shown) of the states of the human-to-machine interface 115 to display to the user.

In addition or alternatively, the communications management system 105 enables user interaction with the human-to-machine interface 115 via the visual representations by displaying the visual representations on a graphical user interface of the communications units 110*a-b*, and triggering a change of state of the human-to-machine interface 115 upon user interaction with a visual representation. User interaction with the visual representation may include touching a visual representation (note shown) via a touch screen, clicking a visual representation via a cursor, or selecting a visual representation via a voice command The communications management system 105 may trigger a change of state in the human-to-machine interface 115 by issuing a generated voice command to the human-to-machine interface 115 or a dual-tone multi-frequency signaling (DTMF) keypad input, thereby replacing any additional action required by the user save the user's interaction with the visual representations.

As stated above, some transactions with the human-to-machine interface 115 may include many stages or operations. In order to facilitate and expedite a communications session, the communications management system 105 determines a goal transaction for a user to provide input to a human-to-machine interface. For example, a goal transaction may be a request to purchase a product/service or pay a bill. Further, the communications management system 105 constructs and presents a visual representation of the voice input parameter for the goal transaction. For instance, the visual representation of the voice input parameter may represent multiple operations of the goal transaction optionally available for the user to employ to achieve interaction with the human-to-machine interface 115 in fewer stages than through individual interaction the human-to-machine interface 115. In addition, in some embodiments, the communications management system 105 enables user interaction with the human-to-machine interface via the visual representations. For instance, a user interaction with the visual representation may include touching the visual representation via a touch screen, clicking the visual representation via a cursor, or selecting the visual representation via a voice command (e.g., utterance).

In order to determine the goal transaction for a user, the communications management system 105 may track user transactions with the human-to-machine interface. For instance, the communications management system 105, upon determining that a communications session with the human-to-machine interface 115 has begun or is about to begin, monitors changes of state of the human-to-machine interface 150 during the communications session. Further, the communications management system 105 determines an end state of the transaction associated with the communications session and stores the user transactions (e.g., transition states) leading to the end state.

For example, a user may begin a communications session with the credit card company in order to pay a bill. During the communications session, the user may be required to enter several pieces of information (e.g., credit card number, security code, and payment amount), where an entry of a piece of information may cause the human-to-machine interface 115 transition to a different state. Based on the end state in the transition states required to reach the end state, the communications management system 105 may determine a goal transaction and an associated visual representation of a voice input parameter for the goal transaction. Once the visual representation is constructed, the communications management system 105 enables the user to complete a goal transaction by simply selecting the visual representation.

The communications management system 105 may also determine goal transactions based on a plurality of transactions with the human-to-machine interface 115 of a plurality of users. For example, the communications management system 105 may present visual representations associated with the top ten determine goal transactions of the plurality of users. In this way, the communications management system 105 may predict a goal transaction for a user beginning a communications session with the human-to-machine interface 115.

In addition or alternatively, the communications management system 105 may determine the goal transaction of a user by anticipating the goal transaction based on a current user input to the human-to-machine interface 115. The communications management system 105 may be able to make such a determination via a decision tree structure associated with a state machine of the human-to-machine interface 115.

For example, the human-to-machine interface 115 may have an associated state machine that enables the interface to transition from one state to another upon consuming user input. For instance, a beginning state of the human-to-machine interface 115 may enable a user to transition to several different states of the state machine, where each state is associated with a different navigation path. For example, a beginning state of a state machine associated with a credit card company may allow a user to transition to navigation paths associated with, for example, i) accessing account balance information, ii) payment of a bill, and iii) open a new account. Thus, once the user transition to a navigation path associated with the payment of a bill, the communications management system 105 may present visual representations of a goal transaction to pay a pending account balance.

Further, the communications management system 105 may determine a goal transaction of the user by determining pending action items requiring user input. For example, once a user begins a communications session with the human-to-machine interface 115, the communications management system 105 may receive information associated with pending action items. Pending action items may include, for example, payment of a bill, address change, and service modification.

The communications management system 105 may determine the pending action items via active or passive discovery communications messages. For instance, the communications management system 105 may issue a discovery request message to the human-to-machine interface 115 requesting information associated with any pending action items. Upon receiving such information, the communication management system 115 may determine that the pending action items may be possible goal transactions associated with a current communications session of the user with the human-to-machine interface 115 and construct and present visual representations associated with the pending action items. Also, the communications management system 105 may receive such information from the user or human-to-machine interface 115 without issuing a discovery request message.

In another example embodiment, the communications management system 105 may determine goal transactions of the user by analyzing the human-to-machine interface 115. For example, the communications management system 105 may analyze the human-to-machine interface 115 to determine states (e.g., of a state machine associated with the interface as described above) defining available interactions for the user to interact with the human-to-machine interface 115. Using at least a subset of the states, the communications management system 104 may determine goal transactions for the user.

In addition, the communications management system 105 may notify the user that the human-to-machine interface supports input parameters including multiple operations of the user's goal transaction. This enables users without prior knowledge of the human-to-machine interface's capabilities to be informed of the capabilities of the human-to-machine interface 115 at the outset of a communications session. In addition, the communications management system 105 may present the user with example input parameters (that may be associated with determined goal transactions) such that the user is able to model an input parameter of the user's goal transaction with the provided examples.

Figure 2A:
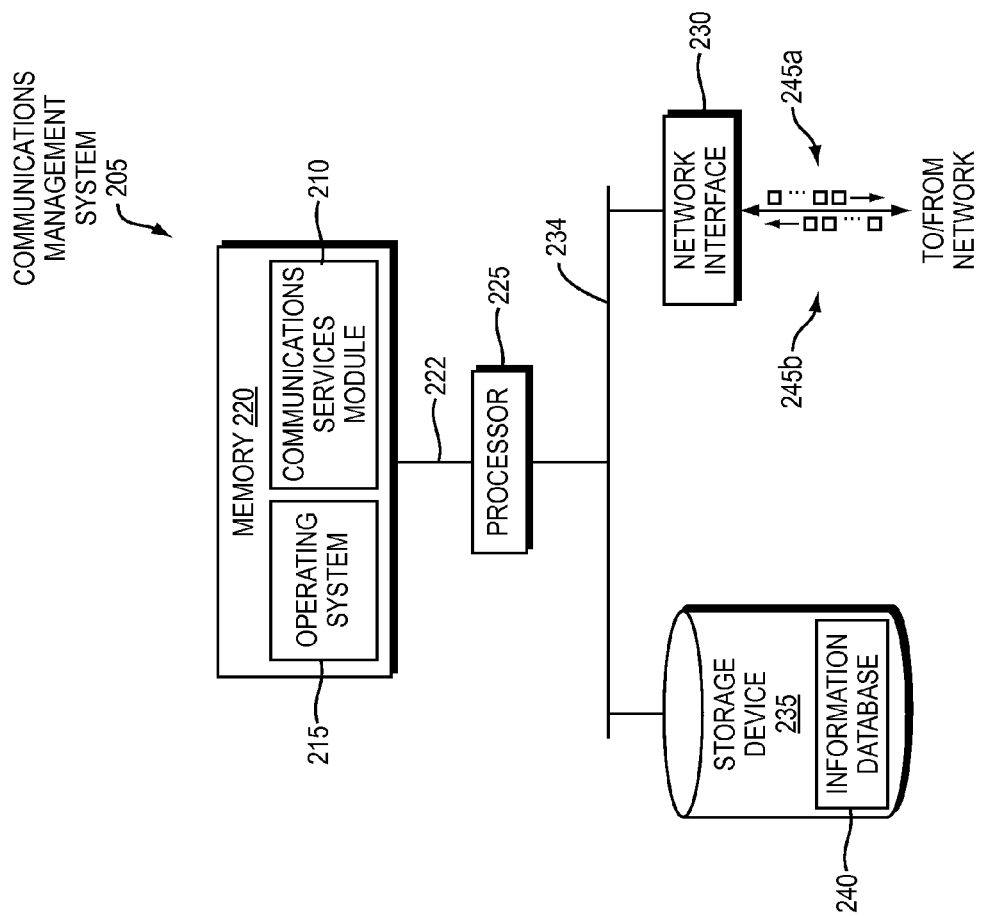
FIG. 2A is block diagram of a communications management system in accordance with an example embodiment of the present invention.

FIG. 2A is block diagram of a communications management system 205 that may be used in connection with an embodiment of the present invention. The communications management system 205 includes a memory 220 coupled to a processor 225 via a memory bus 222, and a storage device 235 and a network interface 230 coupled to the processor 225 via an input/output (I/O) bus 234. It should be noted that communications management system 205 may include other devices, such as keyboards, display units and the like. The network interface 230 interfaces the communications management system 205 with the network 101 (see FIG. 1) and enables data (e.g., packets to be transferred between the human-to-machine interface 115 (see FIG. 1) and other nodes, such as communications units 110*a-b*, and the second party 120) in the network 101. To that end, the network interface 230 may include conventional circuitry that incorporates signal, electrical and mechanical characteristics, and interchange circuits to interface with the physical media of the network 100 and protocols running over that media. The storage device 235 is a conventional storage device (e.g., a disk) capable of storing, inter alia, states of human-to-machine interface, decision tree structures of the states, goal transactions, visual representations of the states, and visual representations of the goal transactions.

The memory 220 is an example of a computer-readable medium, optionally implemented as a RAM employing RAM devices, such as DRAM devices and/or flash memory devices. The memory 220 contains various software and data structures used by the processor 225, such as software and data structures that implement aspects of the present invention. Specifically, the memory 220 may store software configured to serve as an operating system 215 or provide communications management services via communications management module 210. The operating system 215 can be used to functionally organizes the communications management system 205 by invoking operations in support of software processes and services executing on the communications management system 205, such as communications management services. The communications management services 210, as will be described below, may include non-transitory computer-executable instructions to facilitate communications for a user transaction by determining goal transactions for a user, constructing and presenting visual representations of the goal transactions, and enabling user interaction with the human-to-machine interface via the visual representations.

The storage device 235 may include an information database 240, which may be implemented in the form of a data structure that is configured to hold various information used to facilitate communications for a user transaction, such as states of a human-to-machine interface, decision tree structures of the states, goal transactions, visual representations of the states, and visual representations of the goal transactions.

Figure 2B:
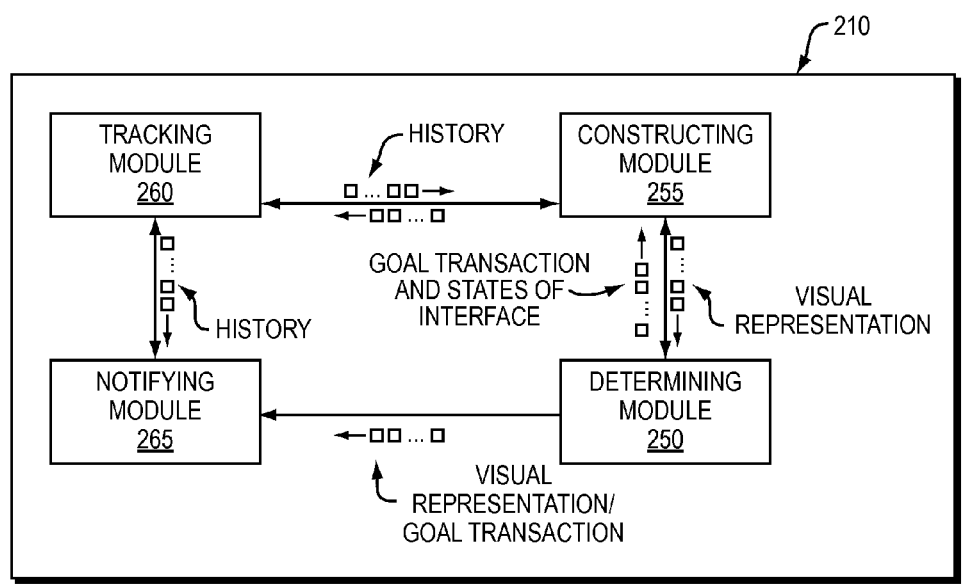
FIG. 2B is a block diagram of a communications management system module in accordance with an example embodiment of the present invention.

FIG. 2B is a block diagram of an example embodiment of a communications services module 210 that includes a determining module 250, constructing module 255, tracking module 260, and notifying module 265.

The determining module 250 determines goal transactions for a user transaction associated with a communications session with the human-to-machine interface 115. In addition, the determining module 250 analyzes the human-to-machine interface 115 and determined states defined therein. In response to determining the goal transactions and the states of the human-to-machine interface, the determining module 250 informs the constructing module 255 of the determined goal transactions and determined states of the human-to-machine interface 115.

Based on the determined goal transactions and the states of the human-to-machine interface, the constructing module 255 constructs and presents visual representations of the goal transactions to the user. In addition, the constructing module 255 enables user interaction with the human-to-machine interface 115. For example, the constructing module 255 enables a user to directly transition to an end-state of the human-to-machine interface 115 associated with the goal transaction by interacting with the visual representation associated with the goal transaction. For instance, the constructing module may encode the visual representations with input parameters associated with each state of a navigation path associated with the goal transactions. Thus, upon the user's interaction with the visual representation associated with the user's goal transaction, the state machine of the human-to-machine interface transitions through the states provided by the visual representations via the communications management system.

Further, the tracking module 260 may track a history transactions between a user and the human-to-machine interface and/or transactions between a plurality of users and the human-to-machine interface. The tracking module may store the history of transactions and pass the historical data to the determining module 250, which may then determine possible goal transactions using the historical data.

In addition, the notifying module 265 may provide users with an indication that the human-to-machine interface is capable of accepting a single input parameter representing multiple operations of a user transaction with the human-to-machine interface. Further, the notifying module 265 may provide the user with example input parameters including multiple operations of a user transaction, such that the user may model an input parameter from the provided example.

Figure 3:
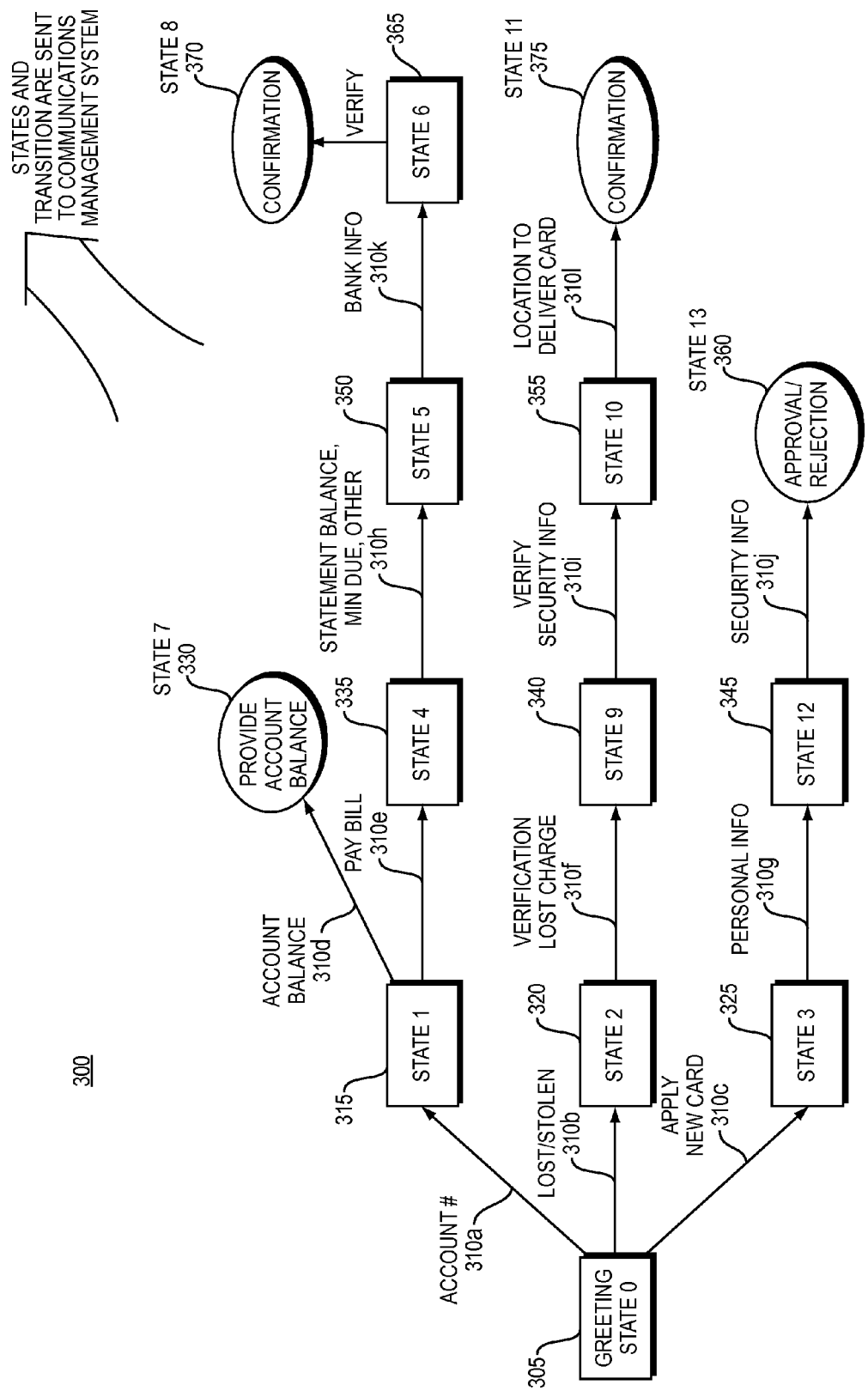
FIG. 3 is a diagram illustrating a state machine of a human-to-machine interface in accordance with an example embodiment of the present invention.

FIG. 3 is a diagram illustrating an example state machine 300 of a human-to-machine interface (e.g., an interactive voice response (IVR) system). As described above, the communications management system 105 may be used to analyze the human-to-machine interface to determine states defined therein. For instance, a user may call a credit card company which employs an IVR system. A user may interact with the credit card company's IVR system via voice, dual-tone multi-frequency signaling (DTMF) keypad inputs, or visual representations (as described above) of the states. Each interaction a user has with a state may cause a transition to another state.

An example state machine 300 of an IVR system for a credit card company may initiate interactions with a user during a communication session with a greeting message (state 0) 305. In this example, state 0 (305) may receive an input for the user including at least one of the following: account number 310*a*,, declaration of a lost/stolen card 310*b*,, or a request to apply for a new card 310*c*. State 0 (305) may then transition to state 1 (315) if an input 310*a*, of an account number is received by the IVR state machine State 1 (315) may then transition to state 7 (330) based on an input 310*d* requesting an account balance. Alternatively, state 1 (315) may transition to state 4 (335) with an input 310*c*, requesting to pay a bill. State 4 (335) may accept input values 310*h*, requesting to pay the statement balance, minimum due, or any other amount.

Once the amount to be paid is received by state 4 (335), the state machine 300 transitions to state 5 (350), which requests and receives as input 310*k*, a user's bank account information that is to be used to pay a current bill. Once state 5 (350) receives input 310$k_i$, state machine 300 transitions to state 6 (365) that requests the user to verify the amount the user would like to pay and the bank account information from which to pay the bill. Once state 6 (365) receives the verification information, the state machine 300 transitions to state 8 (370), which issues a confirmation to the user. The navigation path of the state machine 300 described above is just one of several navigation paths available for a user as illustrated by state machine 300.

The states and transitions are inspected by communications management system 105, which may organize the states and associated transitions into decision tree structure, which maps the states of IVR state machine 300 to visual representations of the states. Further, the communications management system 105 may analyze the state machine 300 and associate a goal transaction with each possible navigation path of the state machine 300. This enables a user via the communications management system 105 to reach an end state of every possible navigation path of the state machine via a single interaction with a visual representation of a goal transaction.

Figure 4A:
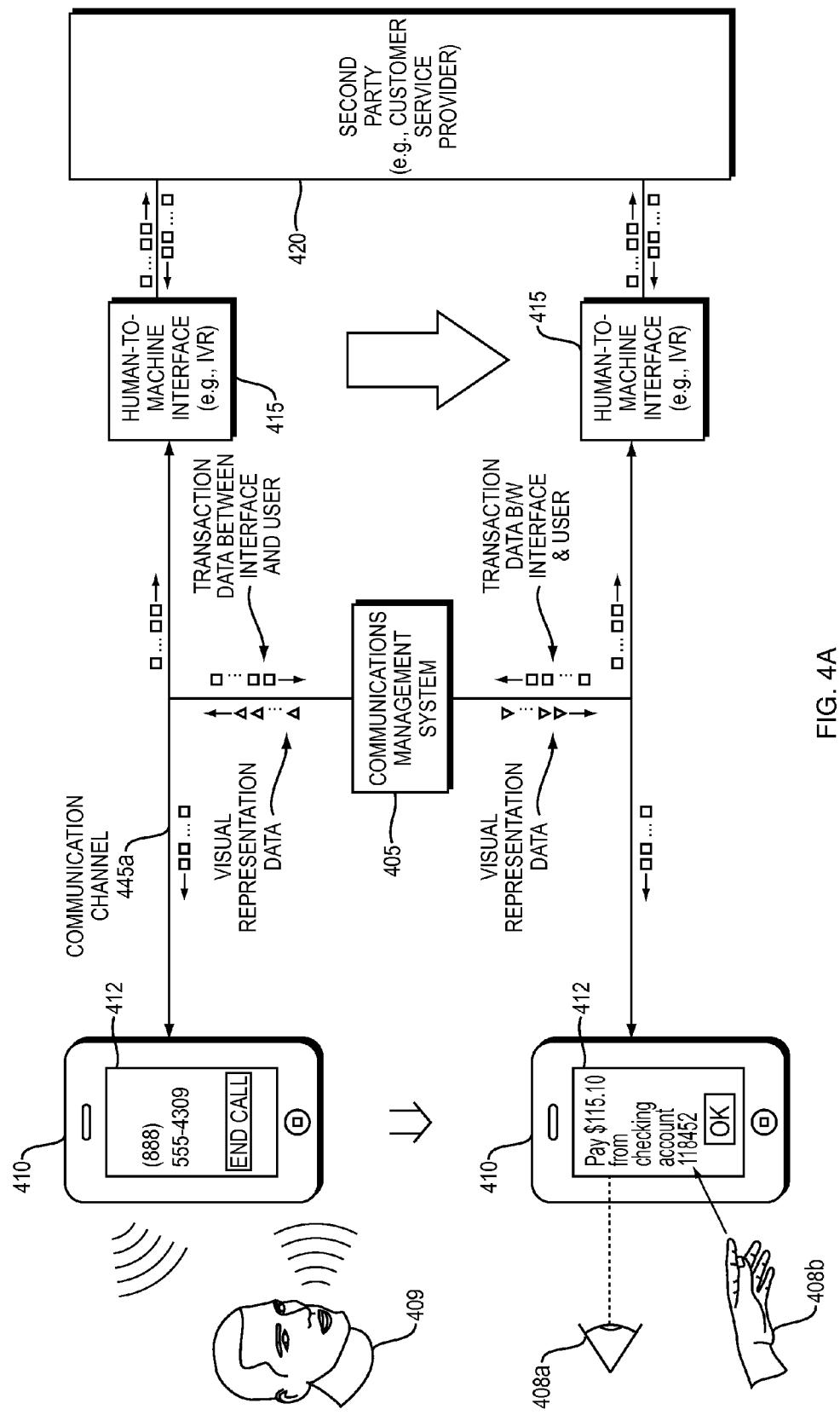
FIGS. 4A-B are network diagrams illustrating the construction and presentation of a visual representation of a voice input parameter representing multiple operations of a goal transaction in accordance with an example embodiment of the present invention.
Figure 4B:
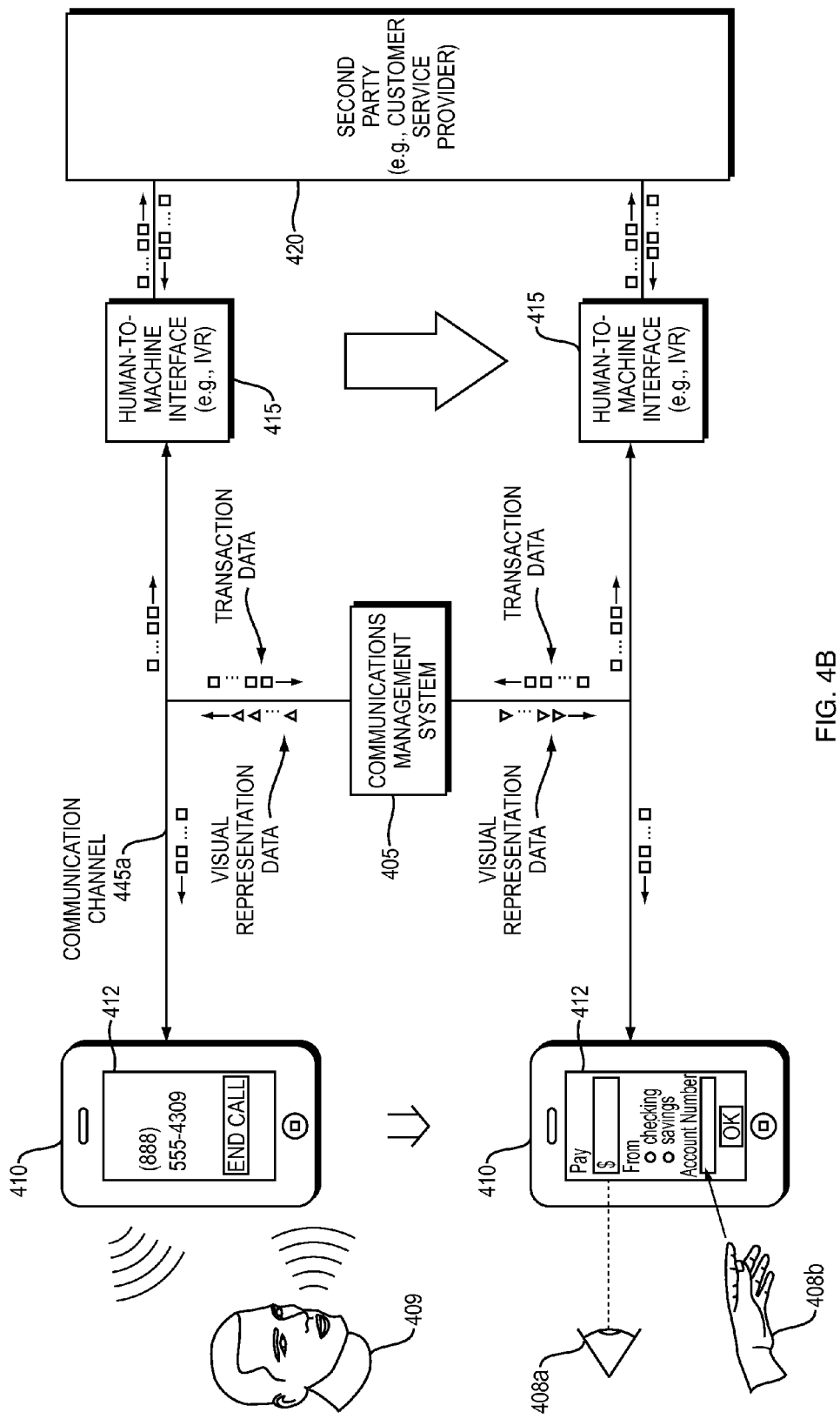

FIG. 4A-B is are network diagram illustrating the construction and presentation of a visual representation of a voice input parameter representing multiple operations of a goal transaction in accordance with an example embodiment of the present invention.

The first party 409, using a user device 410 having a graphical user interface 412, is in communications with a second party 420 via a human-to-machine interface (e.g., IVR system) 415. The IVR system 420 enables the first party 409 to interact with a database of the second party 420.

For example, in telecommunications, the IVR system 415 allows customers 409 to interact with a company's database via a telephone keypad or by speech recognition, after which they can service their own inquiries by following an IVR dialogue. In addition, the IVR system 415 may respond with a prerecorded or dynamically generated audio to direct users further on how to navigate through states of the IVR system 415. The IVR system 415 can be applied to control almost any function where transactions can be sub-divided into a series of simple interactions.

In this example, a communications management system 405 monitors a communications channel 445a, for communications with a second party 430 via the IVR system 415. In response to determining that a communications session is being established, the communications management system 405 determines a goal transaction for the communications session as described above. Contemporaneously with determining the goal transaction, the communications management system 405 presents a visual representation of the goal transaction via the graphical user interface 412 of the communication device 410.

For instance, in this example, the communications management system 405 determines that the goal transaction for the communications session is a transaction to pay statement balance associated with a credit card. The visual representation enables a user to have both visual and tactile interactions 408a-b, with the human-to-machine interface 415. In example depicted in FIG. 4A, the communications management system 405 determines provides the amount to pay and account from which to debit funds in order to process the credit card payment. In certain scenarios, the communications management system 405 may determine that the goal transaction of the user is to pay a statement balance, but does not know how much the user would like to pay and from which account to debit funds. In such a scenario, the communications management system 405 may present the user with a visual representation (or other machine-to-human indicator) having fill-in-the-blank fields for the user to enter the missing information as illustrated in FIG. 4B.

Figure 5:
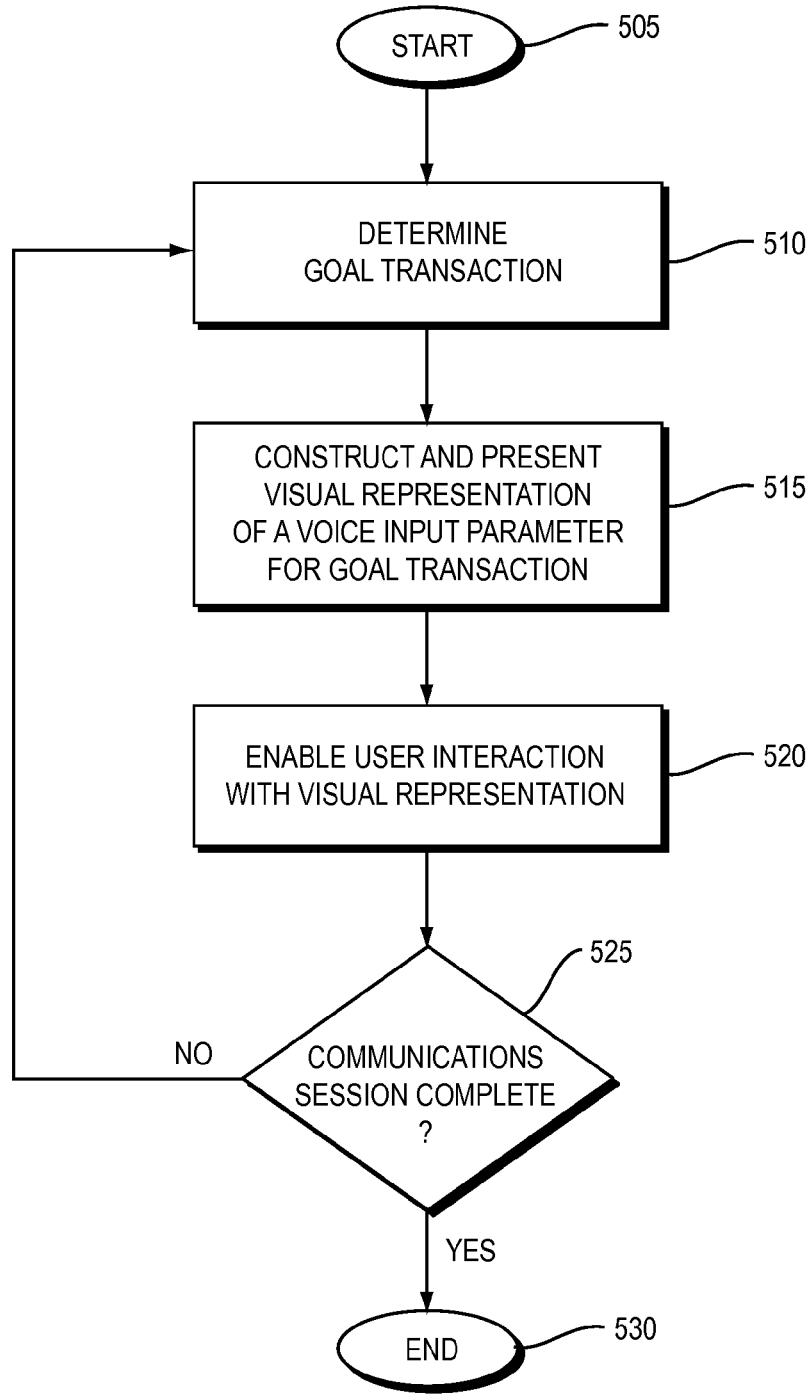
FIG. 5 is a flow diagram of an example method for facilitating communications for a user transaction.

FIG. 5 is a flow diagram of an example method 500 for facilitating communications for a user transaction that may be executed by the communications management system (FIG. 1). The method begins at 505. At 510, the method 500 determines a goal transaction for a communications session. At 515, the method 500 constructs and presents a visual representation of a voice input parameter for the goal transaction, where the visual representation represents multiple operations of the goal transaction optionally available for the user to employ to achieve interaction with the human-to-machine interface in fewer stages that through individual interactions with the human-to-machine interface. At 520, the method 500 enables user interaction with the visual representations. Subsequently, the method 500 determines whether the communications session 525 is complete. If the method 500 determines that the session is not complete, method 500 continues at 510. If the method 500 determines that the session is complete, method 500 ends at 530.

It should be understood that the block diagrams and flow diagrams presented herein are merely example representations of embodiments. The block diagrams and flow diagrams may include more or fewer blocks or states, have more or fewer interconnections, and the like. Other functions known in the art may be employed and are contemplated to be within the scope of the example embodiments presented herein.

Embodiments or aspects of the invention may be implemented in hardware, firmware, or software. If implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for facilitating communications for a user transaction, the method comprising, by a processor and associated memory:

determining a goal transaction for a user to provide input to a human-to-machine interface, said determining including analyzing the human-to-machine interface to determine one or more states and one or more navigation paths of a state machine of the human-to-machine interface defining available interactions for the user to interact with the human-to-machine interface and accounting for at least a subset of the states and associating the goal transaction with at least the one or more navigation paths of the state machine, the user reaching at least one end state of the one or more navigation paths via an individual interaction with a visual representation of a voice input parameter, the state machine operating in a manner consistent with the at least the subset of the states;

constructing and presenting the visual representation of the voice input parameter for the goal transaction based on at least the subset of the states, the visual representation of the voice input parameter representing multiple operations of the goal transaction optionally available for the user to employ to achieve interaction with the human-to-machine interface in fewer stages than through individual interactions with the human-to-machine interface; and enabling a user interaction with the human-to-machine interface via the visual representation.

2. The method of claim 1 further comprising:

tracking one or more individual transactions from the user with the human-to-machine interface;

storing the one or more individual transactions from the user with the human-to-machine interface; and determining the goal transaction for the user based on the one or more stored individual transactions from the user.

3. The method of claim 1 wherein determining the goal transaction includes determining the goal transaction based on a plurality of transactions with the human-to-machine interface of a plurality of users.

4. The method of claim 1 wherein determining the goal transaction of the user includes anticipating the goal transaction based on a current user input to the human-to-machine interface.

5. The method of claim 1 wherein determining the goal transaction of the user includes determining pending action items requiring user input.

6. The method of claim 5 wherein the pending action items include at least one of the following: payment of a bill, address change, and service modification.

7. The method of claim 1 wherein the visual representation enables the user to input the input parameter by selecting the visual representation via a touch screen.

8. The method of claim 7 wherein the visual representation includes fill in the blank field entries requiring additional user input.

9. The method of claim 1 wherein the visual representations are presented to the user via a communications interface enabling multi-mode communication with the human-to-machine interface.

10. The method of claim 1 further comprising notifying the user that the human-to-machine interface supports input parameters including multiple operations of the goal transaction.

11. The method of claim 1 wherein analyzing the human-to-machine interface to determine the one or more states and the one or more navigation paths of the state machine of the human-to-machine interface is performed prior to the user's providing input to the human-machine interface and prior to storing user transactions to determine the one or more states and the one or more navigation paths of the state machine of the human-to-machine interface defining the available interactions for the user to interact with the human-to-machine interface, and further comprising using the one or more states to determine the goal transaction.

12. The method of claim 1, further comprising notifying the user of a capability of accepting natural language commands to the human-to-machine interface and notifying the user of which types of commands the human-to-machine interface accepts.

13. The method of claim 1 wherein determining the goal transaction is performed in accordance with a decision tree structure associated with the state machine of the human-to-machine interface.

14. A system for facilitating communications for a user transaction, the system comprising:

a determining module configured to determine a goal transaction for a user to provide input to a human-to-machine interface, said determining module further configured to analyze the human-to-machine interface to determine one or more states and one or more navigation paths of a state machine of the human-to-machine interface defining available interactions for the user to interact with the human-to-machine interface, said determining module further configured to account for at least a subset of the states and associate the goal transaction with at least the one or more navigation paths of the state machine, the user reaching at least one end state of the one or more navigation paths via an individual interaction with a visual representation of a voice input parameter, the state machine operating in a manner consistent with the at least the subset of the states;

a constructing module configured to construct and present the visual representation of the voice input parameter for the goal transaction based on at least the subset of the states, the visual representation of the voice input parameter representing multiple operations of the goal transaction optionally available for the user to employ to achieve interaction with the human-to-machine interface in fewer stages than through individual interactions with the human-to-machine interface; and wherein the visual representations enable user interaction with the human-to-machine interface.

15. The system of claim 14 further comprising:

a tracking module configured to track one or more individual transactions from the user with the human-to-machine interface;

a data store configured to store the one or more individual transactions from the user with the human-to-machine interface; and the determining module further configured to determine the goal transaction for the user based on the one or more stored individual transactions from the user.

16. The system of claim 14 wherein the determining module is further configured to determine the goal transaction based on a plurality of transactions with the human-to-machine interface of a plurality of users.

17. The system of claim 14 wherein the determining module is further configured to anticipate the goal transaction based on a current user input to the human-to-machine interface.

18. The system of claim 14 wherein the determining module is further configured to determine pending action items requiring user input, the pending action items being identified as possible goal transactions of the user.

19. The system of claim 18 wherein the pending action items include at least one of the following: payment of a bill, address change, and service modification.

20. The system of claim 14 wherein the visual representation enables the user to input the input parameter by selecting the visual representation via a touch screen.

21. The system of claim 20 wherein the visual representation includes fill in the blank field entries requiring additional user input.

22. The system of claim 14 further comprising a communications interface configured to present the visual representation to the user, the communications interface enabling multi-mode communications with the human-to-machine interface.

23. The system of claim 14 further comprising a notifying module configured to notify the user that the human-to-machine interface provider supports input parameters including multiple operations of the goal transaction.

24. A non-transitory computer readable medium having computer readable program codes embodied therein for facilitating communications for a user transaction, the computer readable program codes including instructions that, when executed by a processor, cause the processor to:

determine a goal transaction for a user to provide input to a human-to-machine interface, analyze the human-to-machine interface to determine one or more states and one or more navigation paths of a state machine of the human-to-machine interface defining available interactions for the user to interact with the human-to-machine interface and account for at least a subset of the states and associate the goal transaction with at least the one or more navigation paths of the state machine, the user reaching at least one end state of the one or more navigation paths via an individual interaction with a visual representation of a voice input parameter, the state machine operating in a manner consistent with the at least the subset of the states;

construct and present the visual representation of the voice input parameter for the goal transaction based on at least the subset of the states, a visual representation of the voice input parameter representing multiple operations of the goal transaction optionally available for the user to employ to achieve interaction with the human-to-machine interface in fewer stages than through individual interactions with the human-to-machine interface; and enable user interaction with the human-to-machine interface via the visual representation.

\* \* \* \* \*